United States Patent [19]

Mahan

[11] Patent Number: 4,674,226

[45] Date of Patent: Jun. 23, 1987

[54] FISHING LURE WITH LINE CONNECTION MEANS

[76] Inventor: Joe C. Mahan, 202 Mistletoe Dr., Richardson, Tex. 75081

[21] Appl. No.: 820,069

[22] Filed: Jan. 21, 1986

Related U.S. Application Data

[63] Continuation-in-part of Ser. No. 781,056, Sep. 27, 1985.

[51] Int. Cl.[4] ............................................. A01K 91/04
[52] U.S. Cl. .................................. 43/44.83; 43/42.36; 43/42.48
[58] Field of Search ................... 43/42.36, 42.5, 44.83, 43/44.91, 44.94, 42.48, 42.49, 43.11, 43.1, 42.23; 114/218; 24/117 R, 121, 129 R, 130, 134, 140

[56] References Cited

U.S. PATENT DOCUMENTS

| | | |
|---|---|---|
| 484,254 | 10/1892 | Settle . |
| 1,193,912 | 8/1916 | Maire . |
| 2,077,184 | 3/1937 | Rader . |
| 2,269,615 | 1/1942 | Walker . |
| 2,459,287 | 1/1949 | Robbins . |
| 2,788,604 | 4/1957 | Sleight .............................. 43/42.48 |
| 3,226,874 | 1/1966 | Boyd .................................. 43/42.36 |
| 4,117,574 | 10/1978 | Yoshida . |
| 4,134,224 | 1/1979 | Clark .................................. 43/42.36 |
| 4,145,835 | 3/1979 | Ratte . |
| 4,401,059 | 7/1984 | Bury . |
| 4,459,775 | 7/1984 | Ratte . |

FOREIGN PATENT DOCUMENTS 26071 11/1905 United Kingdom .................. 24/130

OTHER PUBLICATIONS

Two pictures of "The Gripper", Golden Eye Products, P.O. Box 35267, Minneapolis, MN 55434.

Primary Examiner—Nicholas P. Godici
Assistant Examiner—G. M. Reid
Attorney, Agent, or Firm—Kanz, Scherback & Timmons

[57] ABSTRACT

A fishing lure for attachment to a fishing line without tying a knot in the fishing line. The fishing line includes an elongate body and one or more hooks attached to the lure body. A plurality of pairs of spaced outwardly facing gripping members are transversely mounted in aligned pairs on the body. The fishing line is secured to the lure by engaging alternating gripping members on alternate sides of sequential pairs of gripping members.

28 Claims, 18 Drawing Figures

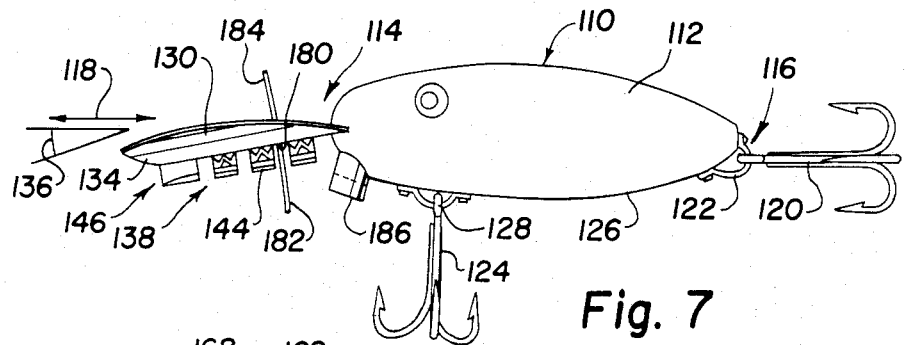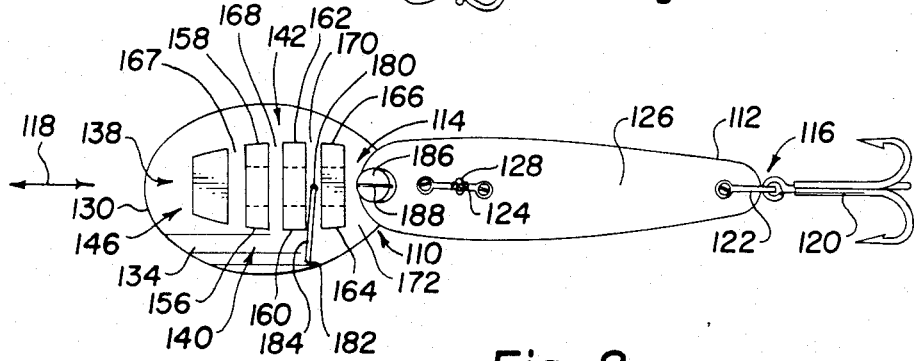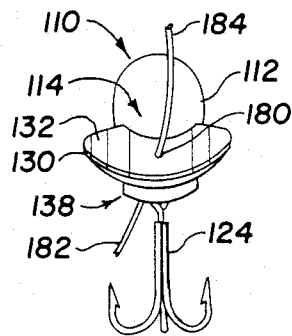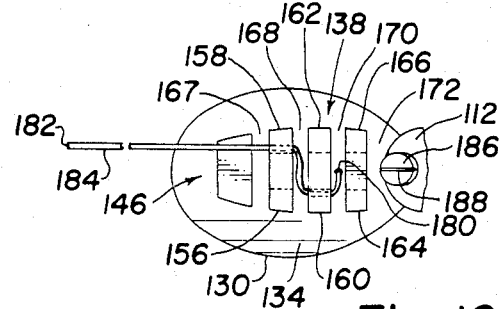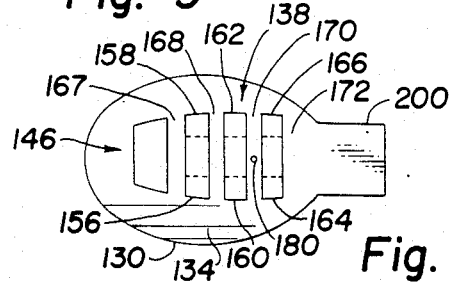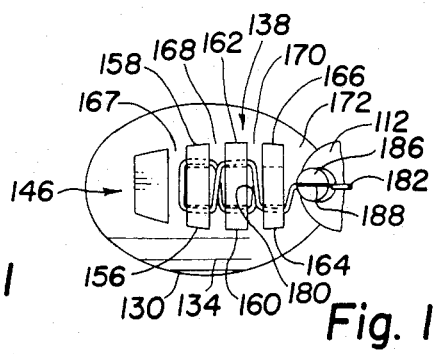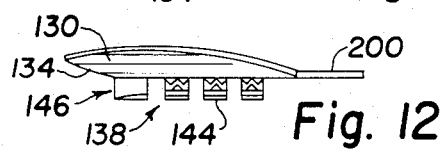

FISHING LURE WITH LINE CONNECTION MEANS

This application is a continuation-in-part of U.S. patent application Ser. No. 781,056, filed Sept. 27, 1985 and entitled "Apparatus For Securing A Fishing Lure To A Fishing Line".

FIELD OF THE INVENTION

This invention relates in general to fishing equipment, and more particularly to fishing lures attachable to a fishing line.

BACKGROUND OF THE INVENTION

A conventional fishing pole includes a tapered, flexible rod with a handle and a reel mounted on the rod adjacent the handle. A length of fishing line is partially wound on the reel and extends along the rod through a series of "eyes" mounted on the rod. A fishing lure may be connected to the end of the fishing line and is used to attract and hook fish. Conventional fishing lures are attached to the fishing line by inserting the fishing line through a hole, also known as an "eye", in the lure, or a loop attached to the fishing lure, and tying the line thereto. In order to disconnect the fishing lure from the fishing line, the fishing line must be cut. An additional piece of equipment called a "leader" is sometimes used and is attached to the fishing line. A leader is a relatively short (usually 6 to 18 inches in length) piece of fishing line or metal wire. The fishing line is tied to one end of the leader. The other end of the leader typically includes a resilient clip. The leader may be connected or disconnected to a number of different fishing lures by manipulation of the clip, without requiring the fishing line to be cut.

However, these conventional designs are inefficient and difficult to use under actual fishing conditions. The line strength of a conventional monofilament fishing line is severely reduced if formed into a knot, due to the stresses and deformation introduced thereby. The knot thus becomes the "weak link" in the equipment used by a fisherman and increases the possibility of a broken line when a fish is caught on the fishing lure.

During fishing, it is frequently desired to change fishing lures so as to use a different size, shape, color or design. This may be in response to a change in environmental conditions such as the weather or time of day, or the type of fish sought, or simply at the discretion of the fisherman. Further, on occasion the line is cut accidently, such as if the fishing line is broken or the fishing lure becomes snagged on an underwater obstruction, all requiring the attachment of a new fishing lure and leader, if one is used. It is important to disconnect the existing lure from the fishing line and connect the new fishing lure quickly and easily, so that fishing may be resumed as soon as possible. Cutting the existing fishing lure from the fishing line and tying the line to a new fishing lure is a very time consuming process and requires a great deal of manual dexterity to manipulate the relatively small diameter fishing line. Fishing is often conducted under adverse weather conditions and a fisherman may be wearing bulky clothing and even gloves, thus making it difficult to tie a knot in the fishing line. A leader represents an additional expense to the fisherman and still requires that the leader be tied to the fishing line. Further, under the aforementioned adverse weather conditions, it is still difficult and time consuming to open or close the clip on the end of the leader.

SUMMARY OF THE INVENTION

This invention provides a fishing lure having an elongate body adapted to attract fish and one or more fishing hooks mounted on the body for penetrating the flesh of an encountered animal form, such as a fish. A connection member is formed on the fishing lure body and includes a plurality of outwardly facing gripping members in spaced, transversely aligned pairs symmetrical about the longitudinal axis of the lure body. The gripping members are adapted to frictionally engage the fishing line so as to secure the fishing lure thereto. In one embodiment, the spaced pairs of gripping members are formed on the underside of the lure body intermediate the front and rear ends thereof. An inclined passageway extends from the front end of the lure body at the longitudinal axis, to the foremost pair of gripping members to provide a path for the fishing line. The fishing line may be wrapped around the gripping members to secure the fishing lure thereto without tying a knot in the fishing line. The fishing line is easily released by unwrapping the fishing line from the gripping members and pulling the fishing line out through the passageway. In another embodiment, the fishing lure body includes a spoon having a forward facing inclined concave surface. The pairs of gripping members are formed on the under side of the spoon and a passageway extends from the concave surface to the under side of the spoon intermediate the pairs of gripping members. The fishing line is attached to the fishing lure by wrapping the fishing line about the gripping members, and may be released by disengaging the fishing line from the gripping members and pulling the fishing line out through the passageway in the spoon. In either embodiment, the fishing lure may also include a member having a slit formed behind the rearmost pair of gripping members adapted to receive the end of the fishing line and secure the end during use of the fishing lure. In yet another alternate embodiment of the invention, a spoon may be separately constructed with a connection member as described above. The spoon is constructed for mounting on any one of numerous fishing lure body designs.

Therefore, it is a principle feature and advantage of this invention to provide an improved fishing lure which may be quickly and easily secured or removed from a fishing line.

It is another feature and advantage of this invention to provide an improved fishing lure which is attachable to a fishing line without tying a knot in the fishing line.

It is another feature and advantage of this invention to provide an improved fishing lure which may be disconnected from a fishing line without cutting the fishing line.

BRIEF DESCRIPTION OF THE DRAWINGS

So that the manner in which the above recited features and advantages of the invention, as well as others which will become apparent to those skilled in the art, are obtained and can be understood in detail, a more particular description of the invention briefly summarized above may be had by reference to the embodiments thereof which are illustrated in the accompanying drawings, which drawings form a part of the specification and in which like numerals depict like parts in the several views. It is noted, however, that the appended drawings illustrate only a preferred embodiment of the invention and are therefore not to be considered limiting of its scope, for the invention may admit to other equally effective embodiments.

FIG. 1 is a side view of a fishing lure according to this invention.

FIG. 7 is a side view of an alternate embodiment of a fishing lure according to this invention.

FIG. 8 is a bottom view of the fishing lure of FIG. 7.

FIG. 9 is a front view of the fishing lure of FIG. 7.

FIG. 10A is a detailed bottom view of the fishing lure of FIG. 7 partially connected to a fishing line.

FIG. 10B is a detailed bottom view of the fishing lure of FIG. 7 fully connected to a fishing line.

FIG. 11 is a bottom view of a spoon constructed according to the present invention.

FIG. 12 is a side view of the spoon of FIG. 11.

DETAILED DESCRIPTION OF THE INVENTION

Figure 1:
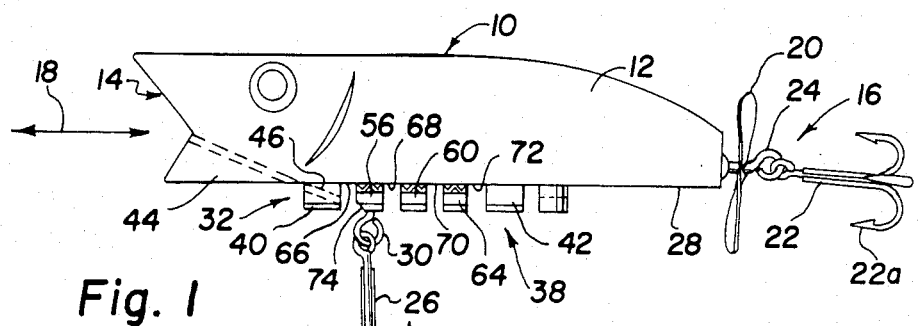
Figure 2:
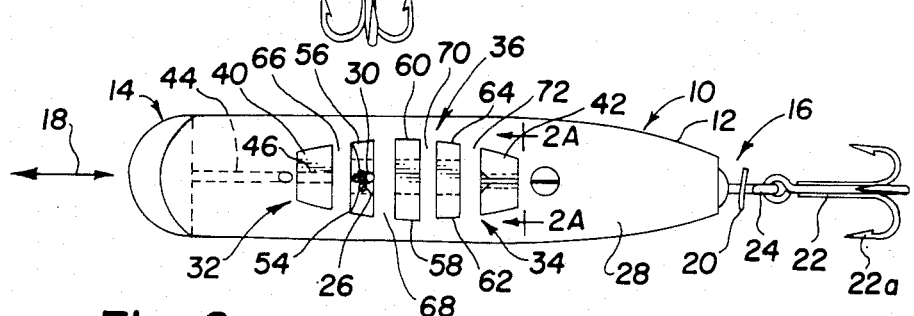
FIG. 2 is a bottom view of the fishing lure of FIG. 1.
Figure 3:
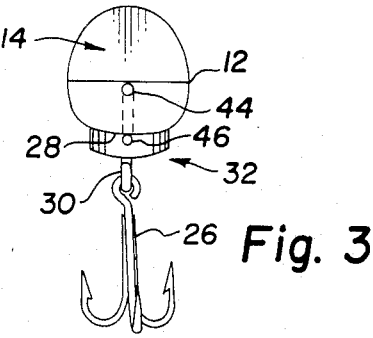
FIG. 3 is a front view of the fishing lure of FIG. 1.

Referring now to FIGS. 1–3, the reference numeral 10 generally indicates a fishing lure constructed according to this invention. The fishing lure includes elongated streamlined body 12 adapted to resemble a small fish, although it is recognized that a body may be employed of any size, shape, color or appearance found to be effective in attracting fish, as is known in the art. Body 12 is constructed of a monolithic molded plastic piece. Various materials may be employed to form the body. However, it has been found advantageous to construct the body from a material with a density approximately equal to that of the water (i.e. fresh water or salt water) in which the fishing lure is to be used. The body will thus have a neutral buoyancy. Specifically, a material having a specific gravity of between 0.95 and 1.05 has been found to be advantageous. Polyamides, such as nylon, or polystyrene, polypropylene, or polyethylene are materials which are available in the above range of densities for use in forming the apparatus of this invention. Of course, a material could be selected which has a density greater or less than the above specified range, if desired.

The lure body defines front end 14, rear end 16 and longitudinal axis or line of action 18 extending therethrough. The longitudinal axis is designed to be in alignment with a fishing line (not shown) when attached to the fishing lure and being pulled through the water. Spinner 20 is rotatively mounted on the rear end of the body and induces a movement in the fishing lure when the lure is being pulled through the water that has been found effective in attracting fish. Fishing hook 22 is mounted on the rear end of the lure body by eyelet 24, in conjunction with the spinner. The hook is shown as a treble hook having a main shank portion and three barbed points 22a connected to the main shank by looping curved portions. The barbed points are adapted for penetration and secure engagement of encountered animal forms, such as fish. Although a treble hook is shown, the fishing lure of this invention may employ a hook having one, two, or more than three barbed points, if desired. Second fishing hook 26 is mounted on underside 28 of the lure body by eyelet 30 at a point intermediate the front and rear ends thereof. The second fishing hook may conveniently take the same form as the first hook.

Means are provided to quickly and easily connect the fishing lure to a fishing line (not shown in FIGS. 1–3). The connection means includes connection member 32 integrally formed on the underside of the fishing lure body. The connection member includes convex sides 34 and 36, respectively, and convex bottom surface 38, all of which form a streamlined profile to reduce resistance as the fishing lure is pulled through the water. Connection member 32 terminates at one end 40 adjacent the front end of the fishing lure and at another end 42 directed towards the rear end of the fishing lure, with each end forming parallel surfaces transverse to the longitudinal axis of the fishing lure. Inclined passageway 44 is formed in the fishing lure body extending from the front end of the body at the intersection with the longitudinal axis, to the underside of the body adjacent the front end of the connection member. The passageway is larger in diameter than the fishing line to which the fishing lure is to be secured.

Figure 2A:
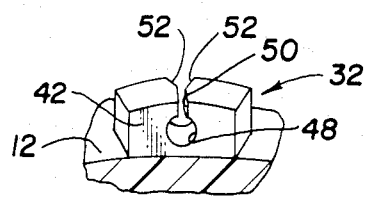
FIG. 2A is a magnified view of the rear end of the connection member of FIG. 1.

Front end 40 of the connection member includes inclined passageway 46 extending through the front end of the connection member and generally aligned with passageway 44. Passageway 46 is also larger in diameter than the fishing line to which the fishing lure is to be secured. As is also shown in FIG. 2A, passageway 48 is formed on the rear end of the connection member generally parallel to the longitudinal axis of the fishing lure body. Slit 50 is formed on the rear end of the connection member communicating with passageway 48 and having a width greater than the diameter of the line connected to the fishing lure, but less than that of passageway 48. Beveled edges 52 are formed about the inward end of slit 50 to faciliate the insertion or removal of the fishing line from the slit.

The connection member includes six outwardly facing gripping members 54, 56, 58, 60, 62 and 64, respectively, which are formed transversely with respect to the longitudinal axis of the fishing lure body. Preferably, the ends of the various gripping members conform to the curvature of sides 34 and 36. Gripping members 54 and 56; 58 and 60; and 62 and 64, respectively, form three aligned outwardly facing pairs symmetrical about the longitudinal axis of the body. Each pair of gripping members is spaced from adjacent pairs and from front end 46 and rear end 42, by line accommodating spaces 66, 68, 70 and 72 as shown in the drawings. Beveled surface 74 is formed on gripping members 54 and 56 opposite the end of the passageway 46 in the front end, and as illustrated is inclined at a 45° angle from the longitudinal axis.

Figure 4:
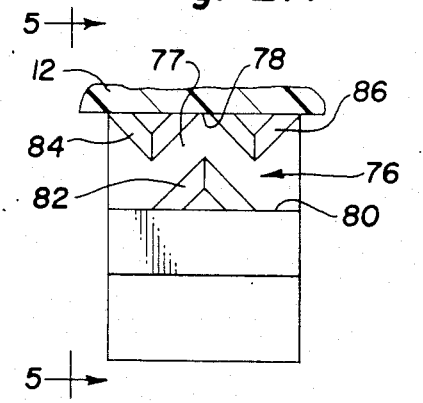
FIG. 4 is a magnified side view of a gripping member of the fishing lure of FIG. 1.
Figure 5:
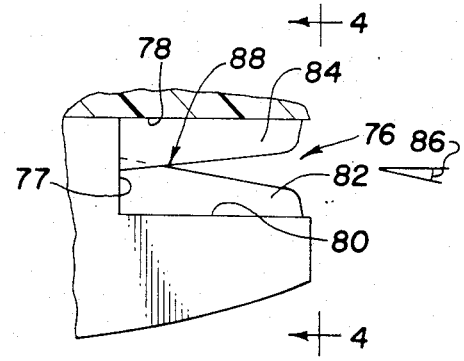
FIG. 5 is a cross sectional view of a gripping member of FIG. 1.

FIGS. 4 and 5 illustrate in detail a gripping member which includes slot 76 having upper surface 78 and opposing parallel lower surface 80 separated by back wall 77. Lower tooth 82 is formed in lower surface 80 and extends transversely from back wall 77 along the longitudinal axis 18 of the fishing lure. Upper teeth 84 and 86 are formed on upper surface 78 extending from back wall 77 generally parallel to the lower tooth 82 and straddle the lower tooth. Both the upper and lower teeth are triangular in cross section, with the apex directed towards the opposing surface of the slot. Other cross-sectional shapes for the teeth may be employed as may be found useful. Also, the positions of the upper and lower teeth may be reversed within the slot, if desired As shown particularly in FIG. 5, the upper and lower teeth are tapered and diverge as they extend outwardly from the longitudinal axis. The teeth are tapered at a relatively shallow angle 86, preferably 10°. Moreover, the teeth are so constructed that although spaced apart, when viewed in profile the lower tooth and the upper teeth extend more than halfway across the height of the slot and thus the respective apexes of the teeth overlap. However, as the upper and lower teeth diverge they crossover at point 88. The distance between the upper and lower teeth adjacent the sides of the connection member is greater than the diameter of the fishing line. This enables the fishing line to be inserted within the slot. As the fishing line is pulled into the slot towards back wall 77, the distance between the upper and lower teeth is reduced to a point at which the teeth contact and frictionally engage the fishing line. The gripping member is able to securely grip the fishing line against forces acting along the longitudinal axis of the fishing lure, such as if a fish is caught on the fishing hooks. The tapered profile of the teeth of the gripping member thus enables the gripping member to accept and grip a wide range of fishing line diameters inserted within the slot and frictionally engaged by the upper and lower teeth. The effectiveness of the gripping member will increase as the fishing line is inserted further within the slot.

Figure 5B:
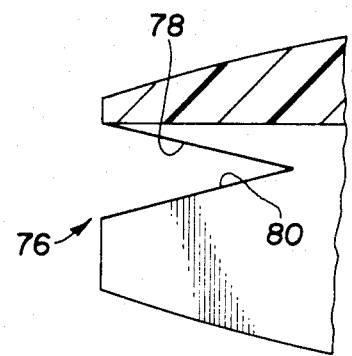
FIG. 5b is a cross-sectional view of yet another alternate embodiment of the gripping member of FIG. 1.
Figure 5A:
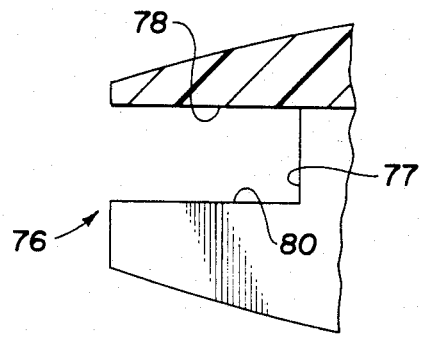
FIG. 5a is a cross-sectional view of an alternate embodiment of the gripping member of FIG. 1.

The gripping members of this invention may employ other structures to grip a fishing line. For instance, the upper and lower teeth may be omitted, and the opposing, parallel surfaces 78 and 80 formed with a roughened or knurled finish in order to grip a suitably sized fishing line inserted into the slot, as shown in FIG. 5a. In another alternate structure shown in FIG. 5b, the upper and lower teeth may be omitted and surfaces 78 and 80 may themselves be inclined and diverge outwardly, provided with a roughened or knurled finish for frictionally engaging a variety of fishing line diameters.

Figure 6C:
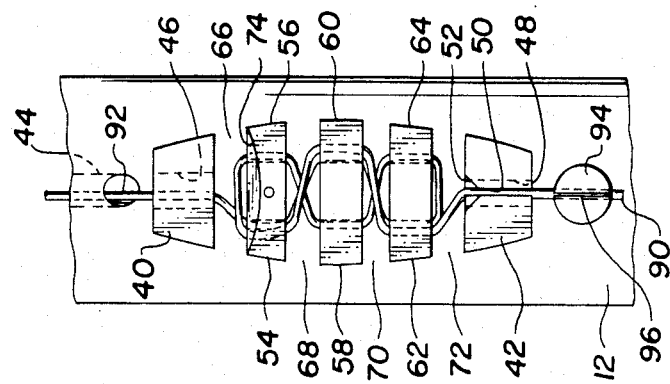
FIG. 6C is a detailed bottom view of the fishing lure of FIG. 6B, with the fishing line fully connected to the gripping members.
Figure 6B:
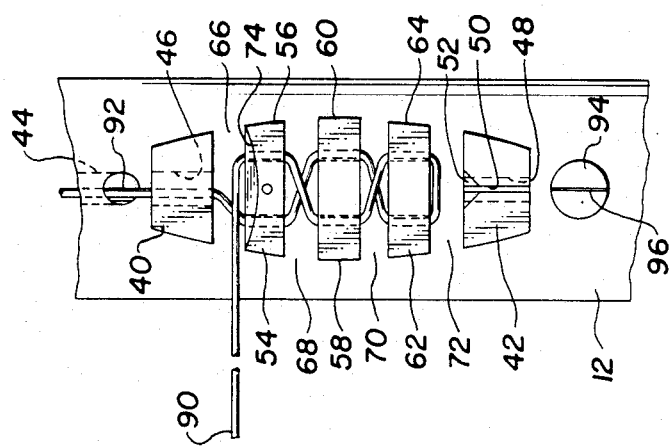
FIG. 6B is a detailed bottom view of the fishing lure of FIG. 6A, with the fishing line partially connected to the gripping members.
Figure 6A:
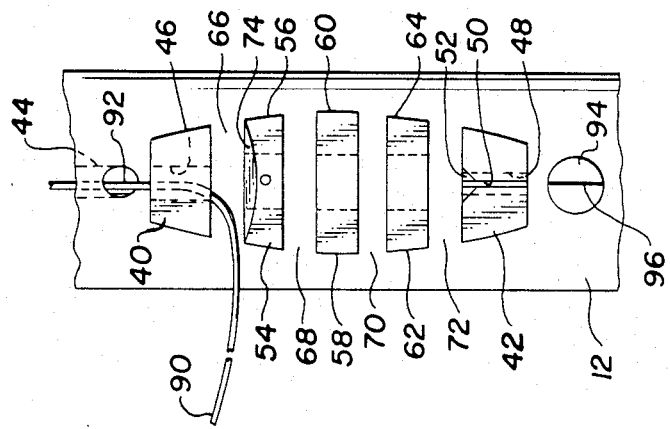
FIG. 6A is a detailed bottom view of the fishing lure of FIG. 1, with a fishing line inserted through the front end passageway.

In operation, end 90 of fishing line 92 is inserted through inclined passageway 44. End 90 continues through passageway 46 in the front end of connection member 32. The end of the fishing line extends across space 66 at an angle and encounters beveled surface 74 of the fishing lure body and is directed upwardly thereby, as shown in FIG. 6A, where it may be grasped easily. In FIG. 6A, fishing hook 26 and eyelet 30 have been removed for clarity. A sufficient length of the fishing line, preferably at least three times the length of the connection member, is then pulled through passageway 46. As shown in FIG. 6B, the fishing line is pulled into engagement with gripping member 56. Referring again to FIGS. 4 and 5, the fishing line is engaged with the gripping member by being pulled into slot 78 between and frictionally engaged with the upper and lower teeth within the slot.

After engagement with gripping member 54 the fishing line is brought diagonally across space 68 and similarly engaged with gripping member 60. The fishing line is then brought diagonally across space 70 and is engaged with gripping member 62. To complete the connection, the fishing line extends past gripping member 62 in space 72 to and through gripping member 64, and then back diagonally across space 70 to gripping member 58 then back diagonally across space 68 to and through gripping member 56, as shown in FIG. 6B. To complete the connection, the fishing line then circles behind gripping member 56 in space 66 back to and through gripping member 54, then back a second time diagonally through space 68 to and through gripping member 60 a second time, then back diagonally through space 70 to and through gripping member 62 a second time, then back diagonally through space 72 to and through slit 50 into passageway 48 guided by beveled surfaces 52, as shown in FIG. 6C. Fishing line 92 exits passageway 48 with end 90 protruding slightly past rear end 42.

Means are provided by the connection member to secure the end of the fishing line after engagement with the gripping members, and to prevent the fishing line from unravelling due to vibration or random forces during use. In the illustrated embodiment, the securing means takes the form of downwardly depending cylindrical member 94 having longitudinally aligned slit 96. Body 94 is preferably integrally formed with body 12 of the lure and the slit is adapted for frictional engagement with the end of the fishing line therein, as shown in FIG. 6C.

The apparatus of this invention thus securely connects the fishing lure to the fishing line. The connection or disconnection of the fishing line is quickly accomplished without requiring a knot to be tied or the fishing line to be cut. Further, the absence of a knot in the fishing line insures that its full line strength will be employed during fishing. Disconnection of the fishing line is easily accomplished by extracting end 90 of fishing line 92 from slit 96, and from passageway 48 through slit 50, then "unlacing" the line by sequentially pulling it out from engagement with each of the gripping members in reverse order. The fishing line may then be pulled through passageways 44 and 46. Another fishing lure may then be secured to the fishing line by engagement with the gripping members, as previously described.

Turning now to FIGS. 7-9, there is shown an alternative embodiment of this invention at 110. The fishing lure includes elongated, streamlined body 112, preferably constructed of the materials previously discussed and having front end 114, rear end 116, and defining longitudinal axis 118. As in the case of the first embodiment, the body is adapted to attract fish and may be constructed to resemble a small fish, or any other size, shape, color or appearance found advantageous in a fishing environment. First fishing hook 120 is mounted by bracket 122 on the rear end of the body and is similar in function to the fishing hooks mounted on the embodiment pictured on FIGS. 1-3. Second fishing hook 124 is mounted on under side 126 of the fishing lure body by bracket 128 at a point intermediate the front and rear ends thereof.

Spoon 130 is formed on the front end of the fishing lure body. The spoon defines an upper concave surface 132, and a lower, convex surface 134. The spoon is inclined with respect to the longitudinal axis of the fishing lure body at an angle 136, whih is preferably beween 0° and 45°. Such spoons have been known in the past and used to control the depth at which the fishing lure descends as it is being pulled during fishing. A fishing line is connected to such conventional fishing lures at a point on the concave surface of the spoon below the longitudinal axis of the fishing lure. The forward facing, inclined concave surface creates resistance for the fishing lure as it encounters the water. This resistance is converted by this eccentric connection into a force pushing the fishing lure downward. The depth of the fishing lure is determined by the displacement between the longitudinal axis and the point of connection with the fishing line. That is, the closer the point of connection of the fishing line to the front end of the spoon, or the smaller the angle of inclination of the spoon with respect to the longitudinal axis, the shallower the depth at which the fishing lure is positioned as it is being pulled through the water. Conversely, the depth may be increased by increasing the angle of the spoon, or by shifting the point of connection of the fishing line closer to the front end of the fishing lure body. In this embodiment, it may be found advantageous to use a material to construct the fishing lure that is denser than water, to assist in creating deeper diving lures.

Connection member 138 is integrally formed on under side surface 134 of the spoon in vertical alignment with the longitudinal axis of the fishing lure body. The connection member includes convex sides 140 and 142 respectively, and convex bottom surface 144, all of which form a streamlined profile to reduce resistance as the fishing lure is pulled through the water. Connection member 138 terminates at one end 146 adjacent the front end of the spoon forming a parallel surface transverse to the longitudinal axis of the fishing lure.

Six gripping members 156, 158, 160, 162, 164 and 166, respectively, are formed on the connection member transversely with respect to the longitudinal axis of the fishing lure body. Preferably, the ends of the various gripping members conform to the curvature of sides 140 and 142. Gripping members 156 and 158; 160 and 162; and 164 and 166, respectively, form three aligned, outwardly facing pairs symmetrical about the longitudinal axis of the body. Each pair of gripping members is spaced from adjacent pairs and from front end 146 and the lure body, by spaces 167, 168, 170 and 172 as shown in the drawings. Each of the gripping members are constructed and function as previously described with respect to the embodiment in FIGS. 1–3 and as shown in FIGS. 4 and 5.

Passageway 180 is formed in the spoon and extends from the concave surface to the under side of the spoon at a point intermediate one of the pairs of gripping members. Passageway 180 is adapted to receive end 182 of fishing line 184. As shown in FIGS. 7–9, passageway 180 extends downwardly through the spoon and emerges on the under side thereof in space 170 between the rearmost pairs of gripping members 164 and 166; and 160 and 162 of the connection member. If desired, passageway 180 could be constructed so as to emerge in spaces 167, 168 or 170 thereby inducing the fishing lure to operate at varied depths when pulled through the water.

The fishing lure is secured to the fishing line as shown in FIG. 10A, with a sufficient length of the fishing line pulled through passageway 180, preferably at least twice the length of the connection member. The fishing line is pulled across space 170 into engagement with gripping member 160, then diagonally across space 168 into engagement with gripping member 158. To complete the connection of the fishing lure to the fishing line, and as shown in FIG. 10B, the fishing line continues across space 167 into engagement with gripping member 156, as shown. The fishing line continues across spacae 168 into engagement with gripping member 162, then diagonally across space 170 into engagement with gripping member 164.

Means are provided to secure the end of the fishing line so that it is not unraveled from the connection member by vibration or random forces as the fishing lure is being pulled through the water. In the illustrated embodiment, the securing means takes the form of member 186 integrally formed on the under side of the fishing lure body behind the connection member. Member 186 includes longitudinal slit 188 adapted to frictionally engage the end of the fishing line when inserted therewithin, as shown in FIG. 10B. To disengage the fishing lure from the fishing line, it is merely necessary to remove the fishing line from slit 188 in member 186 and unlace the fishing line from the gripping members in reverse order, then pull the fishing line out through passageway 180.

Yet another alternative embodiment of this invention is shown in FIGS. 11 and 12. In this embodiment, spoon 130 is integrally formed as a separate body apart from a fishing lure. The spoon includes connection member 138 with aligned pairs of outwardly facing gripping members as previously described with respect to the embodiment shown in FIGS. 7 through 9. To facilitate the attachment of the spoon to a separate fishing lure body, tab 200 is provided at the rear most end of the spoon. A like shaped and sized slot may be formed in a fishing lure body and the spoon attached at the desired angle relative to the longitudinal axis of the fishing lure body. The spoon may be secured by gluing and/or mechanically secured by means of a bolt or screw or by any other means or combination of means as is known in the art. In this matter, spoons may be prefabricated and then attached to a fishing lure having the size, shape and body type as desired by the fisherman.

Although the invention has been disclosed above, with regard to particular and preferred embodiments, these are advanced for illustrative purposes only, and are not intended to limit the scope of this invention. For instance, the number and spacing of the aligned pairs of gripping members may be varied, from at least one pair to as many as are required to securely fasten the fishing line to the fishing lure. Further, alternative patterns may be used for wrapping the fishing line in engagement with the gripping members, other than what is shown or described. Finally, the gripping members may be formed on the fishing lure on any surface or location found advantageous. These variations remain within the invention as claimed below.

What is claimed is:

1. a fishing lure for attachment to a fishing line or the like, comprising:
   (a) an elongate lure body defining a longitudinal axis, and a front and a rear end thereof;
   (b) one or more fishing hooks mounted on said body for penetrating the flesh of an encountered animal form; and (c) a connection member having at least two aligned pairs of opposing outwardly facing gripping members transversely mounted on said lure body, each adjacent pairs of said at least one pair of said gripping members being longitudinally spaced apart by a fishing line accommodating space, said fishing line accommodating space being adapted to accommodate a fishing line therein and said gripping members being adapted to frictionally engage the fishing line so as to secure the fishing lure thereto,; wherein each of said gripping members include a slot in which a line passing axis of the slot is defined by the direction the slot is adapted to pass a line and said line passing axis is generally parallel to the longitudinal axis of the body, whereby the fishing line maybe engaged with said gripping members and thus the fishing lure is secured to the fishing line.

2. The fishing lure of claim 1, wherein said gripping members each comprise:
(a) a slot formed in said connection member transverse to said longitudinal axis of the fishing lure body;
(b) an upper tooth formed in said slot transverse to said longitudinal axis; and
(c) a pair of lower teeth formed in said slot generally parallel to but offset from said upper tooth, whereby the fishing line is gripped between said upper tooth and said lower teeth when inserted within said slot.

3. The fishing lure of claim 2, wherein said upper tooth and said lower teeth diverge outwardly within said slot.

4. The fishing lure of claim 3, wherein said upper tooth and said lower teeth diverge outwardly at a constant angle of 10°.

5. The fishing lure of claim 1, wherein said connection member further comprise means for securing the end of the fishing line engaged with said gripping members.

6. The fishing lure of claim 5, wherein said means for securing the end of the fishing line comprises a longitudinal slit formed in said lure body adjacent the rear most pair of gripping members of said connection member and adapted to receive and frictionally engage the end of the fishing line.

7. The fishing lure of claim 1, wherein said transverse pairs of gripping members of said connection member are mounted on an under side of said fishing lure body intermediate said front and rear ends, and further comprising an inclined passageway formed in said fishing lure body adapted for receipt of the fishing line and extending from said front end of said fishing lure body at said longitudinal axis to said under side adjacent to said foremost pair of gripping members.

8. The fishing lure of claim 1, wherein said fishing lure body further comprises a spoon mounted on said front end of said fishing lure body, said spoon having an inclined forward facing surface and said transverse gripping members of said connection member being mounted on an opposite side of said spoon and adapted to frictionally engage the fishing line so as to secure the fishing lure thereto, said spoon further including at least one passageway adapted to receive the fishing line and extending from said forward facing surface to said opposite surface of said spoon for conveying the fishing line to said connection member.

9. A fishing lure for attachment to a fishing line or the like, comprising:
(a) an elongate body defining a longitudinal axis, and a front and rear end thereof;
(b) one or more fishing hooks mounted on said body for penetrating the flesh of an encountered animal form; and
(c) a spoon mounted on said front end of said fishing lure body, said spoon having an inclined, forward facing surface; and
(d) a connection member having at least two aligned pairs of opposing outwardly facing gripping members transversely mounted on an opposite side of said spoon each adjacent pair of said at least two pair of said gripping members being longitudinally spaced apart by a fishing line accommodating space, said fishing line accommodating space being adapted to accommodate a fishing line therein and said gripping members being adapted to frictionally engage the fishing line so as to secure the fishing lure thereto, wherein each of said gripping members includes a slot in which a line passing axis of the slot is defined by the direction the slot is adapted to pass a line and said line passing axis is generally parallel to the longitudinal axis of the body, whereby the fishing line maybe engaged with said gripping members and thus the fishing lure is secured to the fishing line, said spoon further including at least one passageway adapted to receive the fishing line and extending from said forward facing surface to said opposite side of said spoon for conveying the fishing line to said connection member.

10. The fishing lure of claim 9, wherein said gripping members each comprise:
(a) a slot formed in said connection member transverse to said longitudinal axis of said fishing lure body;
(b) an upper tooth formed in said slot transverse to said longitudinal axis; and
(c) a pair of lower teeth formed in said slot generally parallel to but offset from and spaced apart from said upper tooth, whereby the fishing line is gripped between said upper tooth and said lower teeth when inserted within said slot.

11. The fishing lure of claim 10, wherein said upper tooth and said lower teeth diverge outwardly within said slot.

12. The fishing lure of claim 11, wherein said upper tooth and said lower teeth diverge outwardly at a constant angle of 10°.

13. The fishing lure of claim 10, wherein said connection member further comprise means for securing the end of the fishing line engaged with said gripping members.

14. The fishing lure of claim 13, wherein said means for securing the end of the fishing line comprises a longitudinal slit formed in said lure body adjacent the rear most pair of gripping members and adapted to receive and frictionally engage the end of the fishing line.

15. A fishing lure for attachment to a fishing line or the like, comprising:
(a) an elongate lure body defining a longitudinal axis;
(b) one or more fishing hooks mounted on said body for penetrating the flesh of an encountered animal form;
(c) a connection member having at least two aligned pairs of opposing outwardly facing gripping members transversely mounted on an under side of said fishing lure body intermediate a front and a rear end thereof each adjacent pair of said at least two pair of said gripping members being longitudinally spaced apart by a fishing line accommodating space, said fishing line accommodating space being adapted to accommodate a fishing line therein and said gripping members being adapted to frictionally engage the fishing line so as to secure the fishing lure thereto, wherein each of said gripping members include a slot in which a line passing axis of the slot is defined by the direction the slot is adapted to pass a line and said line passing axis is generally parallel to the longitudinal axis of the body, whereby the fishing line maybe engaged with said gripping members and thus the fishing lure is secured to the fishing line; and (d) an inclined passageway formed in said fishing lure body and extending from said front end of said fishing lure body at said longitudinal axis to said under side adjacent said foremost pair of gripping members and adapted for receipt of the fishing line.

16. The fishing lure of claim 15, wherein said gripping members each comprise:
    (a) a slot formed in said connection member transverse to said longitudinal axis;
    (b) an upper tooth formed in said slot transverse to said longitudinal axis; and
    (c) a pair of lower teeth formed in said slot parallel to but offset from and spaced apart from said upper tooth, whereby the fishing line is gripped between said upper tooth and said lower teeth when inserted within said slot.

17. The fishing lure of claim 16, wherein said upper tooth and said lower teeth diverge outwardly within said slot.

18. The fishing lure of claim 17, wherein said upper tooth and said lower teeth diverge outwardly at a constant angle of 10°.

19. The fishing lure of claim 15, wherein said connection member further comprise means for securing the end of the fishing line engaged with said gripping members.

20. The fishing lure of claim 15, wherein said means for securing the end of the fishing line comprises a longitudinal slit formed in said lure body adjacent the rear most pair of gripping members and adapted to receive and frictionally engage the end of the fishing line.

21. For use with a fishing lure for attaching the fishing lure to fishing line with like, a body comprising;
    (a) a spoon adapted for mounting on the fishing lure and defining a longitudinal axis and defining an inclined forward facing surface when mounted on the fishing lure; and
    (b) a connection member having at least two aligned pairs of opposing outwardly facing gripping members transversely mounted on an opposite side of said spoon each adjacent pair of said at least two pair of said gripping members being longitudinally spaced apart by a fishing line accommodating space, said fishing line accommodating space being adapted to accommodate a fishing line therein and adapted to frictionally engage the fishing line so as to secure the fishing lure thereto, wherein each of said gripping members include a slot in which a line passing axis of the slot is defined by the direction the slot is adapted to pass a line and said line passing axis is generally parallel to the longitudinal axis of the body, whereby the fishing line maybe engaged with said gripping members and thus the fishing lure is secured to the fishing line said spoon further including at least one passageway adapted to receive the fishing line and extending from said forward facing surface to said opposite side of said spoon for conveying the fishing line to said connection member.

22. The body of claim 21 wherein said gripping members each comprise;
    (a) a slot formed in said connection member transverse to said longitudinal axis of said spoon;
    (b) an upper tooth formed in said slot transverse to said longitudinal axis; and
    (c) a pair of lower teeth formed in said slot parallel to but offset from and spaced apart from said upper tooth, whereby the fishing line is gripped between said upper tooth and said lower teeth when inserted within said slot.

23. The fishing lure of claim 22, wherein said upper tooth and said lower teeth diverge outwardly within said slot.

24. The fishing lure of claim 23, wherein said upper tooth and said lower teeth diverge outwardly at a constant angle of 10°.

25. A fishing lure for attachment to a fishing line or the like, comprising:
    (a) a lure body defining a longitudinal axis and a front and rear end thereof;
    (b) one or more fishing hooks mounted on said body for penetrating the flesh of an encountered animal form; and
    (c) a connection member having at least two pairs of transversely aligned gripped members projecting from said lure body, each adjacent pair of said at least two pairs of gripping members being spaced apart from each other by a fishing line accommodating space, said fishing line accommodating space being adapted to accommodate a fishing line therein, each of said gripping members being adapted to frictionally engage the fishing line so as to secure the fishing lure thereto.

26. The fishing lure of claim 25, wherein said connection member is formed on an underside of said fishing lure body intermediate said front and rear ends, and further comprising a line receiving passageway formed in said fishing lure body extending from said front end of said fishing lure body at said longitudinal axis to said underside of said fishing lure body adjacent to said foremost pair of said gripping members.

27. The fishing lure of claim 25, wherein said fishing lure body further comprises a spoon mounted on said front end of said fishing lure body, said spoon having an inclined forward facing surface and said connection member being formed on an opposite side of said spoon, said spoon further including at least one line receiving passageway extending from said inclined surface to said opposite side of said spoon for conveying the fishing line to said connection member.

28. A fishing lure for attachment to a fishing line or the like, comprising:
    a monolithic molded fishing lure body defining a longitudinal axis and a front and a rear end thereof, said body including a connection member including at least two pairs of transversely aligned gripping members projecting from said fishing lure body, each adjacent pair of said at least two pairs of gripping members being spaced apart by a fishing line accommodating space, said fishing line accommodating space being adapted to accommodate a fishing line therein, said gripping members each including a slot, said slot including a line passing axis defined by the direction the slot is adapted to pass the fishing line and said line passing axis is generally parallel to the longitudinal axis of the body, whereby the fishing line may be engaged with each of said gripping members so as to secure the fishing lure to the fishing line.

* * * * *

UNITED STATES PATENT AND TRADEMARK OFFICE
CERTIFICATE OF CORRECTION

PATENT NO. : 4,674,226

DATED : June 23, 1987

INVENTOR(S) : Joe C. Mahan

It is certified that error appears in the above-identified patent and that said Letters Patent is hereby corrected as shown below:

Column 9, line 10, cancel ",".

Column 12, line 3, after "line" insert -- , --.

Column 12, line 34, "gripped" should read -- gripping --.

Signed and Sealed this

First Day of December, 1987

Attest:

DONALD J. QUIGG

Attesting Officer     Commissioner of Patents and Trademarks